Patented Nov. 14, 1944

2,362,576

UNITED STATES PATENT OFFICE 2,362,576

METHOD FOR PREPARING ORGANIC ACID ESTERS OF CELLULOSE

Carl J. Malm, Rochester, N. Y., assignor to Eastman Kodak Company, Rochester, N. Y., a corporation of New Jersey No Drawing. Application March 17, 1942, Serial No. 435,071

7 Claims. (Cl. 260—225)

This application relates to a method of making organic acid esters of cellulose, having a high content of fatty acid radicals of 3-4 carbon atoms in which one part of cellulose is first pretreated with ¼-2 parts of a pretreating liquid consisting mainly of acetic acid and sufficient sulfuric acid to partially break down the cellulose, followed by the addition of propionic or butyric anhydride, cooled to a temperature of 0° F. or below without the addition of any further lower fatty acid or other organic solvent, except that contained in the anhydride or used as a diluent for catalyst upon its addition.

In the making of cellulose esters, particularly those having a medium or high viscosity, it is ordinarily necessary to control the temperature of reaction, particularly when sulfuric acid catalyst is employed to prevent degradation of the cellulose. It is also desirable in making organic acid esters of cellulose that the first part of the esterification take place rapidly so that the cellulose, by taking on acyl groups, is protected from degradation which causes lowering of the viscosity. To conduct an esterification rapidly and at the same time control that reaction is particularly difficult in the making of cellulose esters having a high butyryl or high propionyl content because of the sluggish action of the anhydrides homologous to and above acetic. The maintaining of cool conditions over the period of esterification merely acts to decelerate the rate of esterification.

One object of this invention is to provide a method for making organic acid esters of cellulose having a high content of fatty acid radicals of 3-4 carbon atoms in which the esterification proceeds rapidly yet a low temperature is provided and the viscosity of the cellulose is not materially affected. Another object of my invention is to provide a process for making cellulose esters having a high content of fatty acid radicals of 3-4 carbon atoms in which the time per batch necessary in the mixer or esterification vessel is less than has heretofore been thought possible in preparing esters of that type. Other objects of my invention will appear herein.

I have found that by pretreating the cellulose in two or more parts with a small amount of acetic acid, with or without some propionic or butyric acid, and some sulfuric acid so that the cellulose is activated without a large amount of liquid being present, followed by the addition of anhydride of at least one of the fatty acids of 3-4 carbon atoms, which has cooled to a temperature of 0° F., or below the anhydride being added in sufficient amount to substantially completely esterify the cellulose in the presence of a sulfuric acid catalyst, the reaction takes place rapidly, the action is uniform and a product, having good characteristics, is obtained.

This application is a continuation-in-part of my application Serial No. 378,249, filed February 10, 1941.

The pretreatment of the process, in accordance with my invention, is carried out as described in my prior application of which this is a continuation-in-part. After the pretreatment has been carried out to the desired degree, the mass may be cooled down from the pretreatment temperature, such as from 100-130° down to 60-70° F. and the refrigerated anhydride and esterification catalyst may be added thereto or, if desired, no cooling of the pretreated cellulose prior to adding the anhydride may be necessary if the anhydride is cooled sufficiently to absorb the heat present in the pretreated mass. With the addition of the anhydride and the esterification catalyst, the reaction begins immediately. The fact that the anhydride has a low temperature initially makes for immediate absorption of much of the heat given off by the reaction between the anhydride and the cellulose. Although a fatty acid anhydride of a fatty acid of 3-4 carbon atoms is ordinarily sluggish, the fact that the anhydride constitutes a considerable portion of the liquid surrounding the cellulose contributes to a much more rapid reaction than when using the ordinary proportions of anhydride and fatty acid in making high propionyl or high butyryl cellulose esters.

The propionic or butyric anhydride employed for the esterification need not be cooled to a temperature much below 0° F., if the pretreated cellulose has been cooled before the addition of the anhydride or if the amount of acid in the pretreatment is very low. In many cases, however, it may be desirable to cool the anhydride to a temperature of —15° F., —25° F. or even as low as —50° F., depending upon the relative proportions of the various reagents which are present.

In carrying out this reaction, ordinarily 2-10% of sulfuric acid is sufficient to promote the reaction. With that proportion of sulfuric acid, an anhydride temperature of 0° to —25° F. is ordinarily sufficient, particularly with the restricted amount of solvent present in the esterification in accordance with my invention. If, however, a larger amount of sulfuric acid is employed, a cooling of the anhydride even lower than —25° F. may be desirable, to absorb the heat generated by the reaction as rapidly as possible and thus prevent too great a rise in temperature. In my process it is preferred that the lower fatty acid (solvent) present be only that resulting from the pretreatment of cellulose, that which may be present in the propionic or butyric anhydride added and that which is employed to dilute the sulfuric acid which is added. Obviously, if desired, a small amount of additional solvent may be added but this is undesirable and is only possible within my invention if a very low proportion of liquid was employed in the pretreatment of the cellulose. As my process depends primarily upon the presence of a high concentration of anhydride to give a rapid reaction, it is desirable to restrict the ratio of liquid to cellulose in the esterification as much as possible so as to result in a relatively high concentration of anhydride without the use of a large excess of anhydride. The ratio of liquid to cellulose in the esterification should be less than 6:1 and preferably no more than approximately 5:1. Restricting the ratio of liquid to cellulose to 5:1 is best accomplished by using an amount of pretreating liquid of approximately ¼-1 part per part of cellulose followed by the addition of the cold anhydride in sufficient amount to substantially completely esterify the cellulose. The amount of catalyst, which is added, is so small compared with the other ingredients of the reaction mixture that the ratio of liquid to cellulose in the esterification is not materially affected thereby.

The amount of anhydride, either propionic or butyric or both, which is employed to esterify the cellulose in accordance with my invention should be sufficient to cause substantially complete esterification but should not increase the liquid to cellulose ratio of the esterification mass beyond that specified. In the esterification of cellulose the final product usually contains a fraction of a percentage less of acyl than theoretical. The term "substantially completely esterified" as used herein is to be understood as referring to a degree of esterification comparable to that ordinarily obtained in preparing tri-acylates of cellulose. The minimum amount of anhydride which can be employed in accordance with my invention will ordinarily be slightly above that amount which will convert the water present to acid plus the theoretical amount to satisfy all of the hydroxyl groups of the cellulose.

This invention relates to cellulose esterification processess in which at least 65% of the total acyl present in the esterification bath is fatty acid groups of 3-4 carbon atoms. For instance, an esterification mixture, the acyl of which consists of 80% of butyryl and 20% of acetyl would be the type with which this invention is concerned. Ordinarily the other acyl present will be acetyl, such as results from the pretreatment of the cellulose. As but a small proportion of pretreatment liquid is employed to activate the cellulose the acetyl content of the esterifying bath can be kept at a minimum. The cellulose esters which result from esterifying cellulose in a bath in which propionyl and butyryl constitutes at least 65% of the total acyl content will contain at least approximately 25% of fatty acid radicals of 3-4 carbon atoms.

One considerable advantage in my process over processes which have been employed heretofore in making cellulose esters is the reduction of the time the esterification vessel or mixer is tied up with each batch. With prior processes using in the esterification a proportion of liquid to cellulose of at least 6:1, the esterification vessel or mixer has ordinarily been tied up with each batch for about 25 hours. By employing a low liquid to cellulose ratio and a cooling of the anhydride, it has been possible to cut down the time in which the mixer is tied up for each batch to approximately 6 hours. This has resulted in making one mixer, employing my invention, do the work of four employing the old cellulose esterification methods, thereby decreasing the cost. The products, made in accordance with this invention, have been tested in various ways and have been found to have properties as good as those of esters which have been prepared by processes in which the mixer or esterification vessel was tied up for much longer times.

A process in accordance with my invention may be carried out by mixing together one part of cellulose with one-half part of acetic acid and a small amount of sulfuric acid for about one-half hour at 100° F., followed by the addition of one more part of cellulose and continued mixing for an additional hour. In some cases it is desirable to add further sulfuric acid to the pretreating liquid upon the addition of the second portion of cellulose, particularly where a low proportion of sulfuric acid was employed in the beginning. The pretreated mass of cellulose is ordinarily at a temperature of at least 100° F. Cold propionic or butyric anhydride may be added directly thereto or better, the mass may be cooled down to a temperature between 50–70° F. At this point approximately four parts of butyric or propionic anhydride, which has been cooled down to a temperature of 0° F. or below, is thoroughly incorporated in the mass. The acylation catalyst is also added either with the anhydride or as soon as the anhydride has been incorporated into the mass. The exothermic esterification commences immediately but, due to the cool condition of the anhydride, the great amount of heat generated is quickly absorbed to a substantial degree so that the temperature of the esterification is easily controlled. Usually the maximum temperature to be employed is somewhere in the vicinity of 90° F. in the preparation of cellulose esters having a medium or high viscosity. In spite of the initial low temperature the reaction proceeds rapidly due to the high concentration of anhydride, the rate depending upon the proportion of sulfuric acid present. Ordinarily, it is desirable to have about 2 to 8% of sulfuric acid, based on the weight of the cellulose, to give a rapid reaction without causing any appreciable degradation of the cellulose which is esterified. After the esterification is completed, as evidenced by the absence of fiber in the mass, aqueous acetic acid is ordinarily added to convert the anhydride remaining to acid and to hydrolyze the ester to the desired degree.

The following examples further illustrate my invention:

*Example I.*—475 lbs. of acetic acid containing 60 cc. sulfuric acid was added to a mixer, whereupon 400 lbs. of cotton linters were added. Fifteen minutes later 200 lbs. more of cotton linters were added and the pretreatment continued for 45 minutes, whereupon the mixture was cooled to 65° F. To this was then added 2400 lbs. of butyric anhydride cooled to —40° F., followed by 28 lbs. of sulfuric acid diluted with 10 lbs. acetic acid. The mixer jacket water was shut off and the reaction proceeded, reaching a maximum temperature of 90° F. in 4 hours. After a total reaction time of 5 hours a very viscous brilliant solution was obtained. To this was then added 500 lbs. of water diluted with 2,000 lbs. of acetic acid and hydrolysis carried out in the customary way.

*Example II.*—400 lbs. of cotton linters were added to 150 lbs. acetic acid containing 100 cc. sulfuric acid and after one-half hour at 100° F. 200 lbs. more cotton was added. After one-half hour more at 100° F. the mixture was cooled to 70° F., whereupon 2400 lbs. of butyric anhydride containing 30 lbs. sulfuric acid (which mixture had been cooled to −50° F.) was added. The circulation of the jacket water was shut off and the reaction proceeded in 3 hours to a maximum temperature of 85° F. After a total reaction time of 5 hours a viscous homogeneous solution was obtained.

I claim:

1. A process of preparing a lower fatty acid ester of cellulose having a high content of fatty acid groups of 3-4 carbon atoms, which comprises pretreating one part of cellulose with ¼-2 parts of a pretreating liquid essentially consisting of saturated monocarboxylic fatty acid of 2-4 carbon atoms, acetic acid predominating, and sufficient sulfuric acid to only partially breakdown the cellulose physically, until activation has occurred, inducing esterification conditions which comprises adding to the pretreated cellulose sufficient anhydride of at least one of the saturated monocarboxylic fatty acids of 3-4 carbon atoms to substantially completely esterify the cellulose, which anhydride has a temperature no greater than 0° F. and while maintaining a ratio of liquid to cellulose less than 6 to 1 and an amount of 3-4 carbon atom saturated monocarboxylic fatty acid radicals at least 65% of the total acyl content in the esterifying bath, continuing the reaction until substantially complete esterification of the cellulose has occurred.

2. A process of preparing a lower fatty acid ester of cellulose having a high content of fatty acid groups of 3-4 carbon atoms, which comprises pretreating one part of cellulose with ¼-1 part of a pretreating liquid essentially consisting of saturated monocarboxylic fatty acid of 2-4 carbon atoms, acetic acid predominating, and sufficient sulfuric acid to only partially breakdown the cellulose physically, until activation has occurred, inducing esterification conditions which comprises adding to the pretreated cellulose sufficient anhydride of at least one of the saturated monocarboxylic fatty acids of 3-4 carbon atoms to substantially completely esterify the cellulose, which anhydride has a temperature no greater than 0° F. and while maintaining a ratio of liquid to cellulose not more than 5 to 1 and an amount of 3-4 carbon atom saturated monocarboxylic fatty acid radicals at least 65% of the total acyl content in the esterifying bath, continuing the reaction until substantially complete esterification of the cellulose has occurred.

3. A process of preparing a cellulose acetate propionate butyrate having a high content of propionyl and butyryl, which comprises treating one part of cellulose with ¼-2 parts of a pretreating liquid essentially consisting of saturated monocarboxylic fatty acid of 2-4 carbon atoms, acetic acid predominating, and sufficient sulfuric acid to only partially breakdown the cellulose physically, until activation has occurred, inducing esterification conditions which comprises adding to the pretreated cellulose sufficient anhydride of at least one of the saturated monocarboxylic fatty acids of 3-4 carbon atoms to substantially completely esterify the cellulose, which anhydride has a temperature no greater than 0° F. and while maintaining a ratio of liquid to cellulose of not more than 5 to 1 and an amount of propionyl and butyryl at least 65% of the total acyl content of the esterifying bath, continuing the reaction until substantially complete esterification of the cellulose has occurred.

4. A process of preparing a cellulose acetate propionate, which comprises pretreating one part of cellulose with ¼-1 part of a pretreating liquid essentially consisting of saturated monocarboxylic fatty acid of 2-3 carbon atoms, acetic acid predominating, and sufficient sulfuric acid to only partially breakdown the cellulose physically, until activation has occurred, inducing esterification conditions which comprises adding to the pretreated cellulose sufficient propionic anhydride to substantially completely esterify the cellulose, which anhydride has a temperature no greater than 0° F. and while maintaining a ratio of liquid to cellulose of not more than 5 to 1 and an amount of propionyl at least 65% of the total acyl content in the esterifying bath, continuing the reaction until substantially complete esterification of the cellulose has occurred.

5. A process of preparing a cellulose acetate butyrate, which comprises pretreating one part of cellulose with ¼-1 part of a pretreating liquid essentially consisting of saturated monocarboxylic fatty acid of 2 and 4 carbon atoms, acetic acid predominating, and sufficient sulfuric acid to only partially breakdown the cellulose physically, until activation has occurred, inducing esterification conditions which comprises adding to the pretreated cellulose sufficient butyric anhydride to substantially completely esterify the cellulose, which anhydride has a temperature no greater than 0° F., and while maintaining a ratio of liquid to cellulose of not more than 5 to 1 and an amount of butyryl at least 65% of the total acyl content of the esterifying bath, continuing the reaction until substantially complete esterification of the cellulose has occurred.

6. A process of preparing a lower fatty acid ester of cellulose having a high content of fatty acid groups of 3-4 carbon atoms, which comprises pretreating a portion of the cellulose to be esterified with ¼-2 parts (based on the total cellulose to be esterified) of a pretreating liquid essentially consisting of saturated monocarboxylic fatty acid of 2-4 carbon atoms, acetic acid predominating, and sufficient sulfuric acid to only partially breakdown the cellulose physically, then adding the remainder of the cellulose to be esterified and continuing the pretreatment until activation has occurred, inducing esterification conditions which comprises adding to the pretreated cellulose sufficient anhydride of at least one of the saturated monocarboxylic fatty acids of 3-4 carbon atoms to substantially completely esterify the cellulose, which anhydride has a temperature no greater than 0° F., and while maintaining a ratio of liquid to cellulose less than 6 to 1 and an amount of 3-4 carbon atom saturated monocarboxylic fatty acid radicals at least 65% of the total acyl content in the esterifying bath, continuing the reaction until substantially complete esterification of the cellulose has occurred.

7. A process of preparing a lower fatty acid ester of cellulose which comprises pretreating one part of cellulose with ¼-1 part of a pretreating liquid essentially consisting of acetic acid and sufficient sulfuric acid to only partially breakdown the cellulose physically until activation has occurred, inducing esterification conditions which comprises adding to the pretreated cellulose sufficient anhydride of at least one of the saturated monocarboxylic fatty acids of 3-4 carbon atoms to substantially completely esterify the cellulose, which anhydride has a temperature no greater than 0° F. and while maintaining a ratio of liquid to cellulose of not more than 5 to 1 and an amount of 3-4 carbon atom saturated monocarboxylic fatty acid radicals at least 65% of the total acyl content in the esterifying bath, continuing the reaction until substantially complete esterification of the cellulose has occurred.

CARL J. MALM.